2,897,159
CATALYST MANUFACTURE

James Hoekstra, Evergreen Park, and Edward Michalko, Chicago, Ill., assignors by mesne assignments, to Universal Oil Products Company, Des Plaines, Ill., a corporation of Delaware No Drawing. Application June 25, 1956
Serial No. 593,346

3 Claims. (Cl. 252—448)

This invention relates to a method for manufacturing an iron-alumina composite and in particular to a method for manufacturing a composite comprising iron and alumina in the form of small spheres.

It is frequently desirable to manufacture inorganic oxide composites for use as a contact material. These materials are employed as catalysts, catalyst bases, adsorbents or merely as a means for presenting a large surface for contact with a fluid. Typical of such materials are silica, alumina, magnesia, zirconia, composites of these such as silica-alumina, silica-magnesia, silica-alumina-zirconia and the like. It is also frequently desirable to composite any of the above mentioned difficultly reducible oxides with catalytic metals or compounds of metals such as the metals of groups V through VIII as well as copper, silver, gold, etc., and these catalytic materials may be employed as compounds such as the oxide or sulfide, or as the pure metal. It is particularly convenient to employ the above described contact materials in the form of small diameter spherical particles so that even distribution of material flowing through a bed of the particles is obtained. In moving particle processes, the spherical shape enhances the ability of the solid material to flow without clogging or grinding.

Synthetic silica and alumina, or combinations thereof is readily formed by employing well known techniques such as acidifying salts of the metals to form hydrous oxide hydrosols which slowly set up to semi-solid hydrogels which in turn may be dried to form porous solid material having extremely high surface area per unit of volume. This solid form is known as a gel. Gelation time may be hastened by treating acid sols with basic media and/or by increasing the temperature at which gelation occurs.

The hydrosols may be formed into hydrogel spheres by dispersing the hydrosols as droplets into a gelling medium so that the droplets set to firm hydrogel spheres during their free fall and these hydrogel spheres may be dried to form gel spheres. It has been found particularly convenient to employ hexamethylenetetramine as a component of the hydrosol so that when the spheres are dispersed into a hot medium the hexamethylenetetramine decomposes to form ammonia and therefore provides a basic medium to aid gelation within the sphere.

Although this technique has been applied to many materials, difficulty has been encountered in the manufacture of gel spheres containing iron, especially when the iron content is in the range of 10% to 35%. Hydrosols of iron oxide or iron-alumina oxide mixtures may be formed into suitable hydrogel spheroids, however, the usual aging, washing and drying treatment performed on the hydrogel spheres reduces them to a gummy mass and this difficulty becomes more acute as the iron content increases above 10% by weight of the composite. The usual process includes oil aging of the spheres until the reaction is sufficiently complete to resist attack by an aqueous medium followed by ammonia aging which completes the gelation reactions and the ammonia aging is followed by washing and then drying and, when desired, activating calcination treatment.

The present invention provides a method for making hydrous iron oxide hydrosols which may be formed into hydrogel spheres which in turn may be treated in the customary manner to result in hard individual non-agglomerated spheres containing iron oxide or pure iron.

It is an embodiment of this invention to provide a method for preparing spherical particles of alumina and iron oxide which comprises forming an acid alumina sol, mixing a solution of an iron salt therewith, oxidizing the resultant alumna-iron hydrosol until substantially all of the iron is in the ferric state, blending hexamethylenetetramine with the oxidized hydrosol in an amount to cause gelation of the mixture in a gelling medium, dispersing the resultant hydrosol into the gelling medium as small droplets, aging the resultant hydrosol spheroids, treating them with an alkaline solution and subsequently drying the spheroids.

Alumina-iron hydrosols having concentrations of iron in excess of about 10% by weight of the final composite are difficult to make by mixing iron salt solutions with prepared alumina hydrosols because the acid used to form the alumina hydrosol plus the high anion content of the iron salt solution make a mixture with a too low aluminum to anion ratio to be successfully gelled. It is therefore another embodiment of this invention to overcome this difficulty by preparing spherical alumina-iron oxide particles containing from about 10% to about 35% by weight of iron which comprises dissolving from about 65% to about 90% by weight of the ultimate composite of aluminum metal in a solution comprising iron halide, oxidizing the resultant alumina-iron hydrosol until substantially all of the iron is in the ferric state, blending hexamethylenetetramine with the oxidized hydrosol and dispersing the mixture in a gelling medium, removing the resultant alumina-iron hydrogel spheres from the gelling medium and drying and calcining them to produce the desired alumina-iron oxide particles.

When a hydrosol having very high iron content, from about 25% to about 35% by weight of the final composite of iron, is to be prepared, there is some difficulty employing the process described in the foregoing embodiment. At these high concentrations of iron there is a tendency to precipitate iron hydroxide from the solution. This difficulty can be overcome by adding an oxidizing agent to the iron salt solution before all of the aluminum metal is dissolved.

In all of the embodiments of this invention, it is necessary to oxidize the final hydrosol to insure that all of the iron is in the ferric state before the hydrogel is formed. Adding ferric iron exclusively in the formation of the hydrosol is not a sufficient precaution since aluminum and lower oxides thereof exert a strong reducing action on the iron oxides. It is therefore an essential element of this invention that the alumina-iron hydrosol be treated with an oxidizing agent before being formed into the hydrogel.

As may be seen from the foregoing embodiments, the essential element of the present invention is that the iron in the hydrosol is substantially completely in the ferric state. As will be hereinafter illustrated, the presence of iron in the ferrous state exerts some influence upon the alumina-containing hydrosol which prevents its satisfactory gelation.

The hydrosol formed in the present invention must contain alumina, however, it may contain other components to enhance the catalytic activity of the ultimate composite. Therefore, the sol may comprise alumina in combination with such activating ingredients as halogen ions, silica, magnesia, zirconia, boria, titania, etc. The alumina sols may be prepared by digesting aluminum metal in an acid or aluminum salt solution of the proper concentration. When plural hydrosols are to be used, the alumina hydrosol may be blended with a hydrosol of the other ingredients or simply mixed with a salt containing the other ingredient or with finely ground powder of the other ingredient. For example, an alumina hydrosol prepared by digesting aluminum metal in hydrochloric acid may be blended with a silica hydrosol prepared by acidifying a sodium silicate compound and the blended hydrosols may be subjected to gelation conditions as a mixture. By way of further example, another silica-alumina composite may be prepared by mixing ground silica with an alumina hydrosol.

A preferred method of preparing the mixed hydrosol when a high concentration of the activating ingredient is desired is to dissolve aluminum in a solution of a salt of the other ingredient. For example, a mixed alumina iron hydrosol may be prepared by dissolving aluminum metal in a solution of ferric or ferrous chloride which may, if desired, also contain excess hydrochloric acid depending upon the aluminum to iron ratio desired.

The iron salt employed in the process of the present invention may be any suitable soluble form of iron including such materials as ferric chloride, ferrous chloride or the nitrate, sulfate, bromide, etc., salt of either ferrous or ferric iron. Regardless of which iron salt is employed, the subsequent treatment will be the same, namely, to treat the iron ion while in the hydrosol to convert it to the ferric state of oxidation prior to subjecting the hydrosol containing it to gelation. The preferred iron salts are ferrous chloride or ferric chloride because they introduce no non-volatile foreign components into the mixture and because they are relatively cheap, abundantly available and have been used with great success.

The oxidizing agents employed may be any of the well recognized materials used for this purpose. Suitable oxidizing agents include but are not limited to hydrogen peroxide, nitric oxide, nitrogen pentoxide, ammonium nitrate, aluminum nitrate, nitric acid, oxygen or various perchlorates, etc. The preferred oxidizing agent is hydrogen peroxide because it is readily available, it is highly effective, it is easy to use and presents no undue personal hazard. One limitation on the use of hydrogen peroxide is that it must be used at relatively low temperatures due to its tendency to decompose at higher temperatures, however, since hydrosols are generally formed and handled at relatively low temperatures, hydrogen peroxide will usually be satisfactory. When a higher temperature oxidizing agent is required, such material as nitric oxide or ammonium nitrate may be employed.

As hereinbefore stated, the formed hydrosol is dispersed as droplets, usually through drawn tips, shower heads, rotating discs or other distributing means, into a gelling medium. The gelling media used may vary widely but those commonly employed include but are not limited to hot oil, hot air, ammonia, oil impregnated with an alkaline medium such as ammonia or amines, etc. Since the hydrosols are aqueous in nature the gelling medium should be a material substantially immiscible with water. The gelation is usually effected by distributing the hydrogen droplets into the gelling medium so that it may fall through it and while in transit through the medium it will be converted to a semisolid hydrogel which will retain its shape even when in contact with other similar particles.

It is customary to age the hydrogel spheroids thus formed in a non-aqueous medium which is preferably hot so that the gelation reactions may continue, resulting in hydrogel spheres which are better resistant to destruction in subsequent handling processes. The usual method of accomplishing this is to immerse the spheres in hot oil until sufficient treating or aging has been effected.

The next step in the usual process for manufacturing spherical particles is to remove the aged spheres from the hot oil and immerse them in an alkaline medium to complete the gelation reactions. The alkaline medium employed for this is almost universally ammonium hydroxide due to the fact that it is volatile and leaves no residual material on the particles, it is sufficiently alkaline to effect the desired reactions, it is readily available and easy to use. When the presence of alkali metal ions in the ultimate composite is not undesirable, alkaline media such as sodium hydroxide, sodium carbonate, sodium bicarbonate, potassium hydroxide, etc. may be employed.

The completion of the formation process includes the steps of drying and, in the case of catalytic materials, calcining. The drying is just what the name implies and consists generally of removing the spheres from the final aqueous ammonia treatment and exposing them to temperatures up to about 500° F. for a period sufficient to evaporate all free water and the more readily removed water of hydration. Calcining, which is frequently effected in the same oven but at a later time than drying, consists of heating the spheres to a temperature up to about 1100° F. and maintaining that temperature for a sufficient time to remove at least some of the water of hydration from the alumina. This calcining treatment serves to activate the ultimate composite and enhances its ability to promote chemical reactions.

Following are several examples which are presented to further illustrate the novelty and utility of the process of this invention but are not intended as being limiting upon its broad scope.

*Example I*

An iron-alumina-hydrosol was formed by dissolving 106 grams of 99.99% pure aluminum pellets in a solution consisting of 140 grams of 37% HCl and 116.4 grams of anhydrous $FeCl_3$ dissolved in 680 ml. of water. 25 ml. of the resultant mixture was blended with 25 ml. of 30% hexamethylenetetramine and the resultant hydrosol was dispersed as individual droplets into a hot oil column. The hydrogel spheroids resulting from these droplets were removed from the bottom of the column, aged in hot oil for 3 hours after which they were removed from the oil and aged in ammonium hydroxide solution for 1 hour. The spheres were then washed with water and when transferred to a tray for drying, were found to be a viscous gummy mass which could not readily be separated into individual spheres.

*Example II*

Another iron-alumina-hydrosol was made by dissolving 443 grams of 99.99% aluminum in a solution consisting of 408 ml. of 30% HCl and 492 grams of $FeCl_3$ dissolved in 2422 ml. of water. When the mixture was completed 250 grams of 3% hydrogen peroxide was added with continuous mixing and heat. The solution changed from a green to a red-brown color. The oxidized hydrosol was mixed with equal parts of 30% HMT solution and dropped into a hot oil column wherein hydrogel spheres were formed. The resultant spheres were oil aged, ammonia aged and washed identically with those from Example I and upon completion of the washing stage firm individual and non-agglomerated hydrogel spheres resulted, which upon drying were converted to spherical alumina-iron oxide particles of uniform size, high surface area and very little breakage.

*Example III*

A portion of the dry gel spheres from Example II were placed in a glass tube, heated to 650° C. and treated with a stream of hydrogen gas. The spheres changed from a brown color to a dark gray color and $H_2O$ was evolved from the tube. The treatment produced alumina-iron spheres which, when re-exposed to the atmosphere, while hot, oxidized and returned to their original brown color.

As may be readily seen from the foregoing examples, the process of the present invention provides a means for producing composites containing alumina and iron in the form of gel spheres in which the iron and alumina were coprecipitated. As illustrated in Example III, the ferric state of oxidation is important not for ultimate catalytic activity but only for producing the alumina-iron spheres.

After the spheres of alumina-iron oxide are formed, they may be treated to convert the iron into any desired form. For example, to promote various reactions it may be desirable to treat the alumina-iron oxide composite formed by this invention to convert the iron to metallic iron, any of the various iron oxides, iron sulfide, iron chloride, iron bromide, iron fluoride, iron fluoride-boron fluoride complex, iron fluoride-boron fluoride-hydrogen fluoride complex, etc.

Example I and Example II produce composites with identical compositions, however, the differences in the method of production, that is, employing an oxidizing agent at the proper time in the formation process in the case of Example II, results in one case in discrete hard individual spheres of alumina and iron and in the other case a sticky unhandleable agglomerated mass of alumina and iron having the same composition as the former material. The present process, therefore, makes available a well-known and highly useful catalyst in an advantageous form which has heretofore not been attainable.

We claim as our invention:

1. A method for preparing spherical alumina-iron oxide particles containing from about 10% to about 35% by weight of iron which comprises oxidizing an alumina-iron hydrosol containing sufficient iron to yield an ultimate composite containing from about 10% to about 35% by weight of iron until substantially all of the iron is in the ferric state, blending hexamethylenetetramine with the oxidized hydrosol and dispersing the mixture in the form of droplets in a water-immiscible gelling medium, removing the resultant alumina-iron hydrogel spheres from the gelling medium and drying them to produce the desired alumina-iron oxide particles.

2. A method for preparing spherical alumina-iron oxide particles containing from about 10% to about 35% by weight of iron which comprises dissolving from about 65% to about 90% by weight of the ultimate composite of aluminum metal in a solution comprising an iron salt, oxidizing the resultant alumina-iron hydrosol until substantially all of the iron is in the ferric state, blending hexamethylenetetramine with the oxidized hydrosol and dispersing the mixture in the form of droplets in a water-immiscible gelling medium, removing the resultant alumina-iron hydrogel spheres from the gelling medium and drying them to produce the desired alumina-iron oxide particles.

3. A method for preparing spherical alumina-iron oxide particles containing from about 25% to about 35% by weight of iron which comprises dissolving from about 65% to about 75% by weight of the ultimate composite of aluminum in a solution comprising iron halide, subsequently oxidizing the resultant alumina-iron hydrosol until substantially all of the iron is in the ferric state, blending hexamethylenetetramine with the oxidized hydrosol and dispersing the mixture in the form of droplets in a water-immiscible gelling medium, removing the resultant alumina-iron hydrogel spheres from the gelling medium and drying them to produce the desired alumina-iron oxide particles.

References Cited in the file of this patent

UNITED STATES PATENTS

| | | |
|---|---|---|
| 1,148,570 | Bosch et al. | Aug. 3, 1915 |
| 1,775,640 | Griessbach et al. | Sept. 16, 1930 |
| 2,102,160 | Nashan | Dec. 14, 1937 |
| 2,566,521 | Haensel | Sept. 4, 1951 |
| 2,620,314 | Hoekstra | Dec. 2, 1952 |